Dec. 24, 1968 R. A. LOCKWOOD 3,418,173

THERMOELECTRIC GENERATOR WITH LIQUID HYDROCARBON FUEL COMBUSTION HEATER

Filed Feb. 1, 1966 3 Sheets-Sheet 1

INVENTOR.
ROBERT ADDIS LOCKWOOD

BY Gerald A. Koris

ATTORNEY

INVENTOR
ROBERT ADDIS LOCKWOOD
BY Gerald A. Koris
ATTORNEY

INVENTOR.
ROBERT ADDIS LOCKWOOD
By Gerald G. Koris
ATTORNEY

United States Patent Office 3,418,173
Patented Dec. 24, 1968

3,418,173
THERMOELECTRIC GENERATOR WITH LIQUID HYDROCARBON FUEL COMBUSTION HEATER
Robert Addis Lockwood, Northridge, Calif., assignor to North American Rockwell Corporation, a corporation of Delaware
Filed Feb. 1, 1966, Ser. No. 524,162
8 Claims. (Cl. 136—208)

The present invention is directed to a compact, portable thermoelectric generator, and more particularly to such a device having improved efficiency through maximum utilization of combustion energy.

The conventional portable power supplies, energized by batteries or gasoline engines, have a number of drawbacks, particularly where a lightweight, silent generator capable of using available hydrocarbon fuels is required. The gasoline engine electrical generator, having rotating power conversion machinery, is relatively heavy and noisey, and requires vehicular transport for use in remote areas. Conventional easily portable power supplies, such as batteries, have limited lifetimes and restricted operability under severe environmental conditions. Strict requirements are imposed on portable power supplies in terms of weight, lifetime, and noise level for a wide range of applications in communication, military surveillance, and rescue operations. In particular, since the quantity of fuel which can be carried in the storage tanks of a portable thermoelectric generator is limited and the fuel constitutes a considerable fraction of the total weight of the generator, it is necessary to obtain efficient utilization of fuel.

The combination of strict technical requirements and increasing demands for portable electricity generators which do not use rotating machinery have stimulated the development of improved thermoelectric generators. One such generator is disclosed in my copending patent application Ser. No. 465,077, filed June 18, 1965 for "Portable Thermoelectric Generator," commonly assigned. This application discloses a flame-impingement type of combustion system wherein combustion occurs at a plurality of flame ports directly adjacent a plurality of associated hot junctions of thermoelectric couples, thereby increasing thermoelectric efficiency. However, in this and other prior art developments, reject heat from the thermoelectric couples is not utilized and must be transferrd to the environment by blowers or special heat exchange surfaces such as fins.

It is the particular object of the present invention to provide a thermoelectric generator which makes further utilization of reject heat to improve the overall efficiency of the generator.

Another object is to provide a thermoelectric generator which cools the thermoelectric materials and preheats fuel without reducing efficiency of the burner.

Another object of the present invention is to provide a thermoelectric generator which regulates fuel temperature and vapor pressure by use of reject heat from the thermoelectric module.

Another object is to provide in such a generator means for uniformly applying pressure to the thermoelectric elements without individual springs or adjustments.

Still another object is to provide such a thermoelectric generator which does not require heavy heat exchange surfaces, has no moving parts, and eliminates cooling air blowers and fuel pumps.

A further object of the present invention is to provide a self-contained, portable electric power supply using conventional hydrocarbon fuels which converts the heat of combustion of the fuel directly to electricity by thermoelectric means, further utilizes reject heat for fuel preheat and pressure regulation, and rejects heat to the environment without use of special heat exchange surfaces.

Other objects and advantages of the present invention will appear to those skilled in the art from the following detailed description taken together with the appended claims and the accompanying drawings.

In the drawings, FIG. 1 is an elevation view, partly in section, of one embodiment of the present invention;

In the present thermoelectric generator, reject and otherwise wasted heat from the cold side of thermoelectric couples is utilized to perheat fuel and control the vapor pressure thereof. The controlled vapor pressure is used by the burner to aspirate combustion air, thus eliminating blowers. No energy is lost to the burner and as a consequence there is an improvement in the overall efficiency of the system. Further, the liquid fuel serves as the cooling medium for the thermoelectric materials, thereby eliminating less efficient and heavier special heat exchangers, air blowers, and pumps. The liquid fuel coolant also serves to provide uniform hydrostatic contacting pressure for the thermoelectric converter elements. The heated fuel is returned to the fuel tanks and use may be made of surfaces already present in the fuel tank structure to reject a portion of the heat to the surroundings. In addition, the burner is an improved flame-impingement type, completely aspirated, with provision for heat recovery from the flue gases to improve efficiency of the combustion mixture. Thusly, through effective delivery of energy to the hot wall of the thermoelectric module and removal of heat from the cold side thereof to preheat liquid fuel, an optimum delta T is maintained across the thermoelectric materials for efficient generation of electricity and utilization of fuel.

Figure 1:
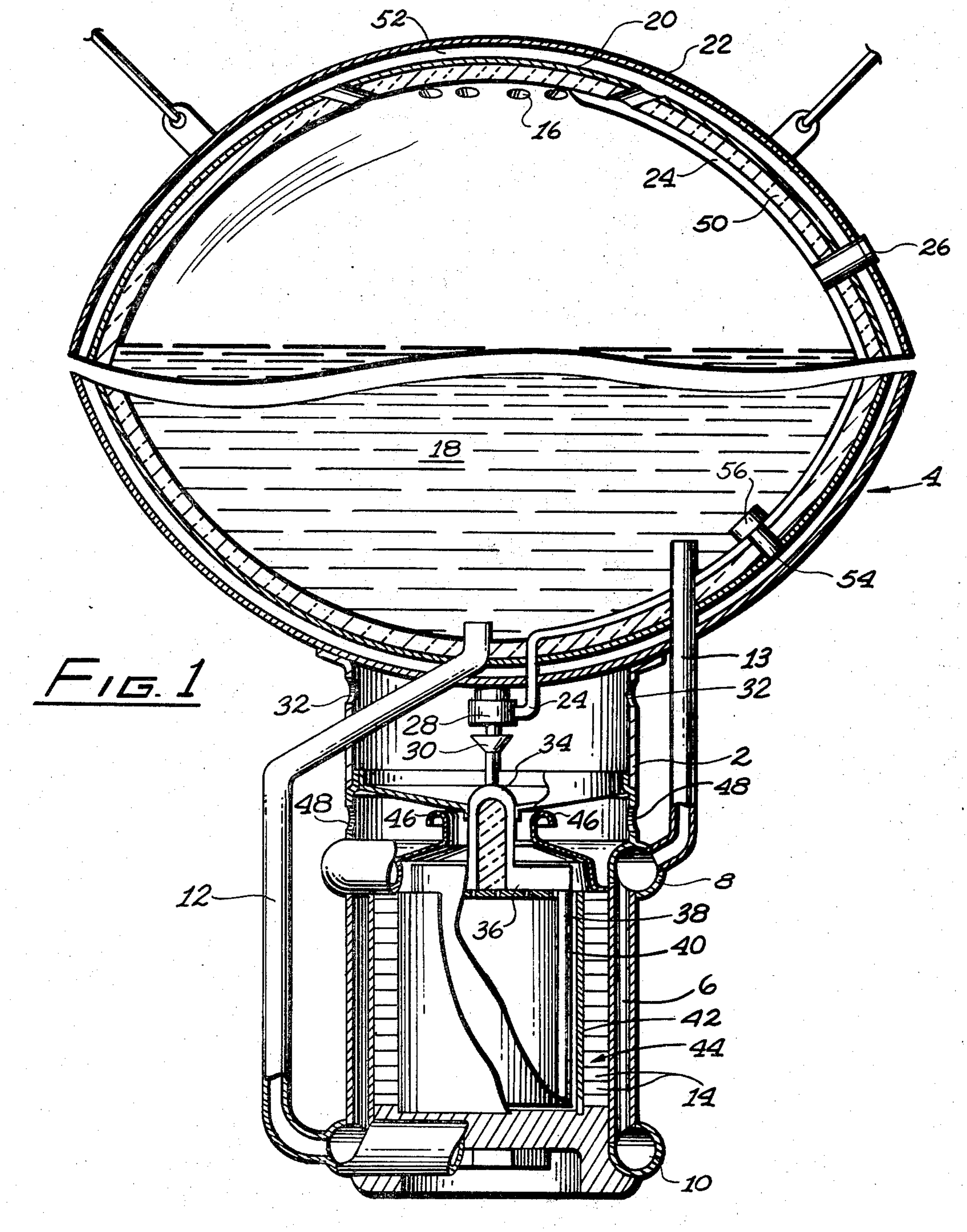

A description of the basic aspects of the present invention will be given with reference to FIG. 1. The thermoelectric generator comprises a cylindrical metal housing 2 conected to a spherical fuel tank 4. Two separate fluid flow systems are provided between the fuel tank and the thermoelectric generator, one for fuel vapor for combustion purposes, and the other for cooling the thermoelectric elements and returning reject heat to the fuel tank.

Fuel circulation takes place between the fuel tank and the thermoelectric generator in the heat rejection system. The heat sink is composed of a plurality of axially extending thin wall tubes 6, the ends of which are joined to top and bottom manifolds 8 and 10. The tubes are flattened to increase the surface area thereof in contact with the cold shoes of the thermoelectric couples. In addition, the tubes adjust for the thermal expansion and contraction of the thermoelectric elements without springs or the like. The thin compliant tubes apply uniform hydrostatic pressure with fuel therein, which maintains the fragile thermoelectric elements under the desired compressive loading. Liquid fuel enters lower manifold through a line 12 positioned in the bottom of the fuel tank, and flows into tubes where it is boiled by the reject heat from the thermoelectric couples 14. The vapor rises through tubes 6 to top manifold 8 and is then returned to fuel tank 4 through line 13. There the vapor condenses, giving up the heat absorbed in the heat sink and is ready to be recirculated. Thus, continuous preheating and pressurization of the fuel is provided.

In the fuel supply system, fuel vapor passes through ports 16 which are positioned above the level of the liquid fuel 18 in the inner of two concentric containers 20 and 22 forming fuel tank 4, and enters into a fuel vapor line 24 communicating therewith. Fuel is added to tank 4 through filler plug 26. Fuel line 24 passes from the fuel tank through a pressure valve 28 into a fuel vapor-air aspirator 30. Fuel vapor is mixed in aspirator 30 with air drawn from the outside through ports 32 and in housing 2, and propelled through a heat exchanger 34 where the combustion mixture is preheated by reject flue gases from the combustion process. The fuel-air mixture then passes through a distributor manifold 36 into a plurality of axially extending burner tubes 38. Each burner tube has a plurality of ports 40 through which the fuel-air mixture is jetted at considerable velocity and burned. The flame is directed against a concentric sleeve or hot wall 42 which directly contacts the axially extending row or submodule 44 of thermoelectric elements 14. The combustion products or flue gases also serve to improve the efficiency of the combustion process by transferring their energy while being exhausted to the environment, first to burner tubes 38 and then to the incoming fuel-air mixture through heat exchanger 34. The flue gases then enter ducts 46 which communicate with exit ports 48.

The boiling temperature of the liquid fuel, and hence the temperature of the evaporating and condensing surfaces, is a function of the pressure in the fuel tank. The heat rejection surfaces of the thermoelectric couples are slightly warmer than the fuel in the tank, and the tank surfaces rejecting heat to the ambient are somewhat cooler than the fuel in the tank. Fuel temperature control may be obtained by adjusting the surface area of the tank exposed to the ambient in the condensing region. One method of accomplishing this is simply by providing a single-walled fuel tank having sufficient surface area in relation to the heat generation rate of the converter. Another way is shown in FIG. 1. The double-wall fuel tank 2 has thermal insulation 50 on the inside. A small annular volume 52 is provided between the concentric walls, which comprises a condensing region. The outer concentric wall 22 maintains pressure and transfers heat to the surroundings; the inner wall 20 separates the compartments and reduces heat transfer to the outer wall in condensing region 52.

Condensing surface on the outer wall is decreased by allowing liquid to build up between the walls, thus preventing vapor from contacting some of the area exposed to outside cooling. A communicating opening 54 between the two compartments allows liquid from the bottom of the condensing chamber to drain through a control valve 56 into the main storage. Vapor flows from the main storage compartment to the condensing surface on the outer wall through the small ports 16 at the top of the inner wall. The liquid level between the walls is controlled by pressure operated valve 56. The point at which the valve is set will determine the rate of condensation; draining liquid from annulus 52 presents more condensing surface.

In another method of temperature or pressure control (not illustrated), bellows-driven mechanical linkages are utilized to expose or cover the condensing surfaces to change thermal contact with the ambient. A single-walled storage tank is provided with segmented insulation on the outside to conform with heat rejection requirements.

Utilizing the above systems, fuel pressure is readily maintained for operating the aspirator which furnishes a fuel-air mixture to the combustion region without any need of axuiliary pumps or blowers.

Figures 2, 3:
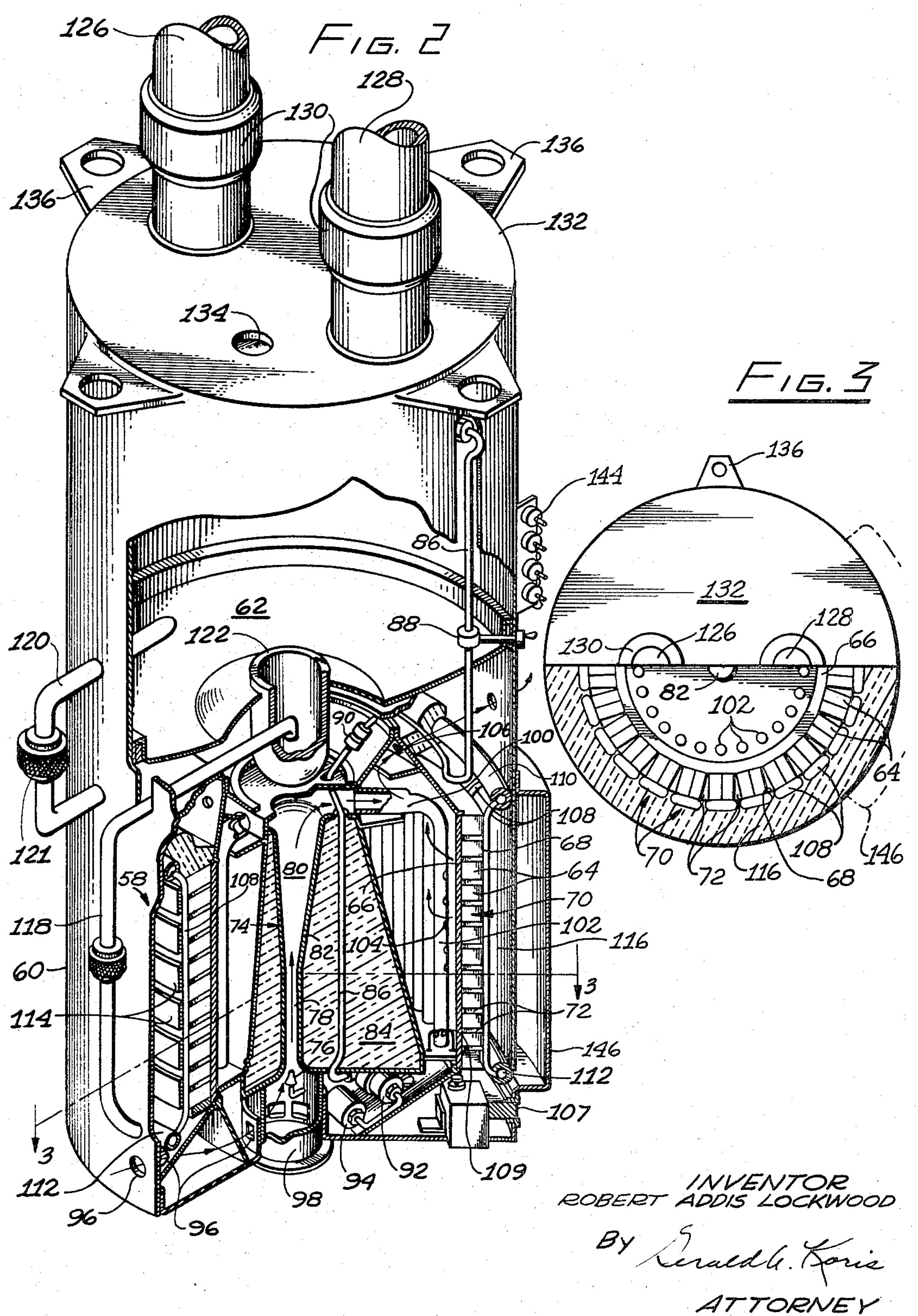
FIG. 2 is a perspective view, partly in section, of a preferred embodiment of the present invention.
FIG. 3 is a section view, partly in elevation, taken along the lines 3—3 of FIG. 2.
Figure 4:
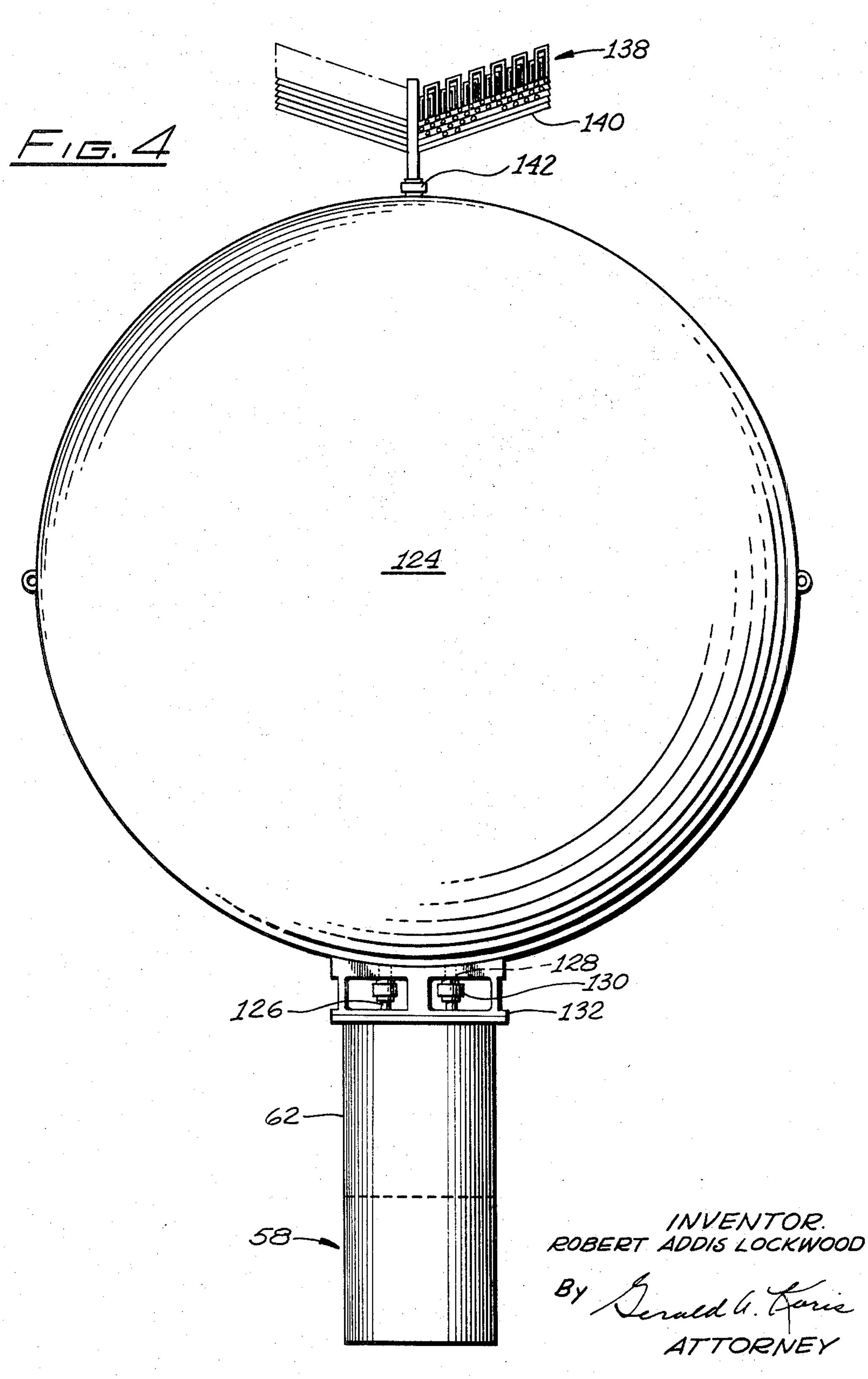
FIG. 4 is a schematic view of the entire preferred embodiment, including the fuel supply tank.

A more complete description of a preferred embodiment of the present invention, a thermoelectric converter designed to produce 100 watts at 28 volts with an overall efficiency of 5%, will now be presented with reference to FIGS. 2, 3, and 4. The basic parts of the power source are: the generator module, consisting of thermoelectric converter, burner, and heat sink; fuel tank; heat dumps; and voltage regulator.

Thermoelectric converter

The thermoelectric converter section 58 is contained in the same housing 60 as a startup fuel tank 62. It is cylindrical, 3.75 in. long, 4.34 in. I.D. and 5.6 in. O.D. The thermoelectric couples 64 are contained in a sermetically sealed annular space between a type 446 stainless steel hot wall 66 (20–30 mils—to bear a vacuum and force of the fuel pressure) and on the outside a thin (3 mils) type 321 stainless steel cold wall 68 covering the thermoelectric cold junctions. The couples are arranged annularly in 28 axial tiers or submodules 70 of ten couples each. Each tier is made up of a plurality of alternate n-type and p-type thermoelectric segments of lead telluride, 0.260 in. O.D. x 0.400 in. long which are separated by insulation 72. Two hundred and eighty such couples in the generator produce at least 100 watts at 28 volts over a thousand-hour life, with the hot junctions at a temperature of 452° C. and the cold junctions at 119° C. Other thermoelectric elements known to the art such as bismuth telluride and germanium-silicon may also be used.

The method of encapsulating and joining the n-type and p-type segments in electrical series with conductor straps such as of copper or aluminum is conventional, by methods known to the art, such as disclosed in my above-identified copending application. Similarly the thermoelectric elements are joined to the hot and cold shoes by pressure or diffusion bonding as described in the copending application. The hot wall and cold wall sections are joined to end closures by seam welding. The end closures contain two electrical power lead-outs (not shown) from the thermoelectric electrical couples. An evacuating tube is welded shut after an inert atmosphere or vacuum has been provided in the thermoelectric module. The insulation 72 between thermoelectric segments is fibrous and has a thermal conductivity of 0.00057 watt per cm. ° C., or 1/30 that of lead telluride.

Assembly of the thermoelectric module is accomplished by attaching submodules 70 to cold wall 68 with epoxy resin. Then the electrical contacts are made between submodules. After making electrical connections to the lower end closure, the cold wall assembly is slipped over hot wall 66 and final seam welds are made at the top and bottom. After final welding, the converter module is helium leak-tested, out-gassed, and either maintained under vacuum or filled with pure argon to an absolute pressure of about 5" of mercury.

The performance data for the thermoelectric module is shown in the followiing Table I.

Table I.—Thermoelectric module data

| | | |
|---|---|---|
| Number of couples | | 280 |
| Total module electrical resistance | | 5.46Ω |
| Generator open circuit voltage | volts | 47.60 |
| Hot junction heat 280×4.215 | watts | 1180 |
| Module heat shunt, 10% | do | 118 |
| Total module heat absorption | do | 1300 |

Fuel burner

The fuel burner is of the flame-impingement type described in my above-referenced copending patent application. It is completely aspirated, with provision for heat recovery from the flue gas to improve efficiency. The aspirator is located in the center of the burner region to save space. The combustion air aspirator 74 comprises a fuel nozzle 76, mixing tube 78, and diffuser 80. A structural member 82 defines the mixing tube 18 having a narrow neck where the gases are aspirated and mixed at high velocity and the diffuser 80 having a divergent upper region in the form of an inverted cone, where there is a recovery of pressure and loss of momentum. The nozzle 76 is of a converging shape, fixed on the axis of the mixing tube in its entrance bell. The nozzle throat is 0.012 in. in diameter for subsonic flow, giving fuel jet velocities of 900–1000 ft. per second, sufficient to accelerate combustion air to about 50 ft. per second in the mixing tube throat. The central core of the burner containing combustion air aspirator 74 is provided with insulation 84 to prevent the incoming air and fuel from being heated by radiation from hot wall 66. Any heat absorbed directly from the hot wall reduces the capacity of the combustion mixture to cool the flue gas, and so reduces overall thermoelectric generator efficiency.

Fuel vapor is supplied by a fuel line 86 extending from the top of the startup tank 4 which has an on-off valve 88 and a disconnect fitting 90. Fuel vapor passes through a fine sintered metal filter 92 and a fuel regulator 94 before entering nozzle 76. The regulator-nozzle combination meters the fuel into the aspirator. Combustion air is drawn into the aspirator through inlet ports 96 in outer shell 2 and in the cylindrical sleeve 98 in which the aspirator is positioned, and follows the path shown by the flow arrows. The requirement of operating reliably in high wind is met by using symmetrically spaced ports which are sized so that there is some pressure drop in the entering and leaving streams even without wind, and the interior passages are very large compared with the ports. This restricts the volume and speed of recirculating air induced by wind inside the device.

The combustion mixture formed in the aspirator passes axially upward to a combustion mix manifold 100 where it is uniformly distributed to a plurality of annular combustion tubes 102, each tube having a plurality of flame ports 104 through which the combustion gases pass, burn, and impinge on the cylindrical hot wall 66. The incoming combsution mixture passing down the tubes is heated by the combustion products directed back thereover from the hot wall. These flue gases leave the generator through ports 106 in the flow direction shown by the arrows. The generator is started by opening valve 88 in fuel supply line 86 and pressing a startup button 107 which activates a startup battery and glow plug 109. The generator is shut down by closing valve 88.

Since most of the heat is transferred directly from the flames to the hot wall in the impingement-type burner, the combustion chamber interior is at a temperature of about 1000° F. The combustion products are cooled as they are forced to pass back between tubes 102 carrying the relatively cool combustion mixture. This serves to reduce heat loss from the burner area not covered by the thermoelectric module. Table II shows overall generator performance.

Table II.—Overall generator performance (basis: 70% burner efficiency)

| | | |
|---|---|---|
| Heat to thermoelectric module | watts | 1300 |
| Heat input to burner | do | 1860 |
| Pounds of butane/hr. | lb./hr | 0.323 |
| Heat to heat sink | watts | 1200 |
| Electrical output | do | 100 |

Heat sink

The heat sink module is composed of 28 vertical, flattened thin wall (0.006 in.) type 302 stainless steel tubes 108, the ends of which are brazed into horizontal toroidal vapor and liquid manifolds 110 and 112 at the top and bottom respectively. The insides of tubes 108 bear against the flats of the thermoelectric module cold wall 68 formed by the cold shoes of the thermoelectric couples to provide compressive loading and are held thereagainst by support belly bands 114. Insulation 116 is disposed between the belly bands and outer generator housing 60 to prevent heat loss from converter section 58. The two manifolds 110 and 112 are connected to startup tank 62 through two lines 118 and 120 having quick disconnect fittings 121. (The various disconnect fittings permit easy separation of converter section 58 from fuel tank 62.) Liquid fuel drawn from above a sediment trap 122 in tank 62 enters lower manifold 112 through line 118 and flows into tubes 108 where it is boiled by reject heat from the thermoelectric couples. The resulting vapor rises through the tubes to top manifold 110, and then returns through line 120 to the fuel tank 62. There the vapor condenses, giving up the heat absorbed in the heat sink, and flows back into the tank to be recirculated. Thus, continuous pressurization of the fuel is provided.

Fuel tank

The fuel supply system in the present embodiment is composed of two separate tanks, the small startup tank 62 contained in the housing of the generator unit, and a main fuel tank 124 (FIG. 4) which is separate from the generator.

The startup tank has two lines 126 and 128 connected through top plate 132 to the main tank (10 cu. ft.) by disconnect fittings 130. Top plate 132 also has a pressure relief valve 134 and mounting lugs 136. The first line 126 is intended only for heating the main tank during startup. The second line 128 passes vapor from the heat sinks to main tank 124 and returns liquid for cooling the heat sinks. Two pressure-operated valves in the lines prevent the flow of fuel when the tanks are cold. During warmup a heater valve in line 126 opens when startup tank 62 pressure reaches a pressure set point. This allows vapor to flow from the startup tank into a closed tube (not shown) in line 126 which passes into the main tank, there to condense and heat the fuel in the main tank. The condensed vapor returns to the startup tank through the same valve. When the main tank has been heated sufficiently to bring the fuel pressure into the operating range, the second pressure valve in line 128 is opened by the main tank pressure, allowing vapor from the startup tank to bubble into the main fuel tank. When the pressure in the main tank is equalized, liquid flows back through the same valve and refills the startup tank. The main fuel tank 124 is fabricated of high strength aluminum alloy (alloy 2219), and has a weight ratio to the fuel of about 1:7.

After the generator has been in operation for a period of time, further heat rejection from the main fuel tank may be required. Such may be accomplished by heat rejection to the surrounding environment by means known to the art or as described above with respect to FIG. 1. For the present embodiment it is preferred to use a heat dump external to the main tank.

Heat dump

The heat dump 138 is composed of a sloping array of ¼-in. O.D. aluminum tubes 140. The fuel tank and heat dump operate together with a pressure controlled valve 142 to maintain the tank fuel pressure at some predetermined value. If the vapor coming from the heat sink cannot condense in heat dump tubes 140 it must condense in fuel tank 124 to raise the tank temperature and pressure. When the pressure reaches the set point in tank 124, valve 142 opens and allows vapor to enter the heat dump again. The heat dump is a more efficient heat transfer surface than many times its weight in solid metal fins which rely on conduction of heat.

The relationship between the sizes of the startup tank 62 and the fuel tank 124 is based upon standard calculations of fuels and combustion energies and efficiencies. For example, a 75-gallon main tank suitable for 1000 hrs. of butane fuel supply requires only a ¾-gallon startup tank. Since propane is less dense, 330 lbs. of propane fuel will require an 86-gallon tank. Propane may be readily used as the startup fuel to temperatures down to about −40° F., due to its high vapor pressure. It may also be used in combination with butane in the main tank. Further, butane and propane are desirable fuels because they are convenient, energetic, and clean, but other hydrocarbon fuels may also be used.

Voltage regulator

Voltage regulation may be achieved by placing the regulator in parallel with the load and generator to draw current when the voltage exceeds the design point and so cause a voltage drop in the generator. Methods known to the art may be used for this purpose, such as an array of Zener diodes or power transistors. Twelve Zener diodes, 10-watt, 6.2 volts, having 0.3 ohm resistance, may be arranged in three parallel strings 144 (FIG. 2) of four series diodes on housing 62, each regulating between 24.8 volts and 26.4 volts. An instrument panel 146 is also positioned on housing 62. An alternative arrangement is possible using four selected 50-watt, 6.2-volt Zeners. In place of the arrangement of Zener diodes, silicon or germanium power transistors may be used, together with a Zener control in the base and a load resistor in the emitter collector circuit.

A 20-watt prototype of the embodiment described above with respect to FIGS. 2–4 was operated which provided substantiation for the design thereof. The overall efficiency of the prototype was measured as the watt hours of electrical energy produced, divided by the heating value of the weight of fuel actually consumed during a period of time. The generator operated over 1300 hours with no significant burner changes while using the fuel tank as the heat sink. Initial overall efficiency observed was 5.8% with a burner efficiency of about 75% and thermoelectric conversion efficiency about 7.75%.

Although the preferred embodiment of the invention has been described with reference to a particular power output and physical configuration, it is understood that the size of the thermoelectric generator may be adjusted for larger or smaller electrical outputs. Further, the present invention is not limited to the foregoing specific details of the particular embodiments described, as modifications will be apparent to those skilled in the art. Therefore, the scope of the present invention is limited only by the appended claims.

What is claimed is:

1. In a thermoelectric generator having an array of thermoelectric elements and a fuel tank containing a liquid hydrocarbon fuel, the heat of combustion of which is converted directly to electricity by said thermoelectric elements:

means contacting said thermoelectric elements for cooling said thermoelectric elements with said liquid fuel, thereby preheating and pressurizing said fuel and maintaining a uniform pressure on said thermoelectric elements.

2. In a thermoelectric generator having an array of thermoelectric elements and a fuel tank containing a liquid hydrocarbon fuel, the heat of combustion of which is converted directly to electricity by said thermoelectric elements:

(a) transfer means for transferring said fuel from said fuel tank to said thermoelectric array, (b) coolant means contacting said thermoelectric array and communicating with said fuel transfer means for compressively loading and cooling said array with said fuel, and (c) return means communicating with said coolant means and with said fuel tank for returning the resulting heated fuel to said fuel tank, thereby heating and pressurizing the fuel in said tank.

3. The thermoelectric generator of claim 2 having:

(a) combustion means disposed adjacent one surface of said thermoelectric array, and (b) means for transferring fuel vapor from said fuel tank to said combustion means.

4. The thermoelectric generator of claim 2 wherein said coolant means includes a plurality of coolant tubes disposed about and in contact with a surface of said thermoelectric array.

5. The generator of claim 2 wherein said coolant means comprises:

(a) a coolant inlet manifold, said inlet manifold communicating with said fuel transfer means, (b) a plurality of coolant tubes communicating at one end thereof with said inlet manifold, said tubes being spaced about and directly contacting a surface of said thermoelectric array, and (c) a coolant outlet manifold communicating with the other end of said coolant tubes for collecting heated fuel from said tubes, said outlet manifold communicating with said fuel return means.

6. In a thermoelectric generator having an array of thermoelectric elements and a fuel tank containing a liquid hydrocarbon fuel, the heat of combustion of which is converted directly to electricity by means of said thermoelectric elements, (a) centrally disposed combustion means adjacent the inner surface of said thermoelectric array, (b) means for transferring fuel vapor from said tank to said combustion means, (c) means for removing combustion product gases from said thermoelectric generator, (d) a coolant inlet manifold adjacent said thermoelectric array, (e) a line for trnasferring liquid fuel from said fuel tank to said coolant inlet manifold, (f) a plurality of coolant tubes parallel to, spaced about, and directly contacting the outer surface of said thermoelectric array, said tubes communicating at one end thereof with said coolant inlet manifold, (g) a coolant outlet manifold communicating with the other end of said coolant tubes, and (h) a return line from said outlet manifold to said fuel tank for returning heated fuel to said fuel tank, to thereby heat and pressurize the fuel in said fuel tank.

7. The generator of claim 6 wherein said fuel tank includes means for rejecting excess heat therefrom.

8. A thermoelectric generator comprising:

(a) an outer housing, (b) a thermoelectric module comprising a plurality of electrically connected thermoelectric elements disposed in a plurality of spaced, axially extending tiers, (c) a central metal sleeve defining an axially extending combustion zone, said sleeve contacting the inner junctions of said thermoelectric elements, (d) a plurality of spaced, axially extending burner tubes in said combustion zone, each burner tube having a plurality of flame ports for uniformly directing combustion flames against said sleeve, (e) a burner manifold connected to said burner tubes for distributing a fuel vapor-air combustion mixture thereto, (f) aspirator means positioned within said sleeve for furnishing said combustion mixture to said burner manifold, (g) means for exhausting combustion product gases to the environment, (h) a fuel supply tank communicating with said aspirator means, (i) a coolant inlet manifold at one end of said thermoelectric array, (j) a line connecting said fuel tank to said coolant inlet manifold, (k) a plurality of axially extending coolant tubes uniformly spaced about and directly contacting the outer junctions of said thermoelectric elements, said tubes being joined to said inlet manifold at one end thereof, (l) a coolant outlet manifold at the other end of said thermoelectric array connected to the other end of said coolant tubes, (m) a line connecting said outlet manifold to said fuel tank for returning heated fuel to said fuel tank, thereby to heat and pressurize the fuel in said tank, and (n) means for rejecting excess heat from said fuel tank to the environment.

References Cited

UNITED STATES PATENTS

| | | | |
|---|---|---|---|
| 724,572 | 4/1903 | Hall | 136—209 |
| 2,966,033 | 12/1960 | Hugel | 136—205 X |
| 3,004,393 | 10/1961 | Alsing | 136—204 X |
| 3,056,848 | 10/1962 | Meyers | 136—210 |
| 3,116,167 | 12/1963 | Talaat | 136—210 |

ALLEN B. CURTIS, *Primary Examiner.*